Nov. 10, 1959  C. E. HUNT, JR  2,912,500
CONVERSION DEVICE FOR FACSIMILE APPARATUS
Filed Dec. 23, 1957  7 Sheets-Sheet 2

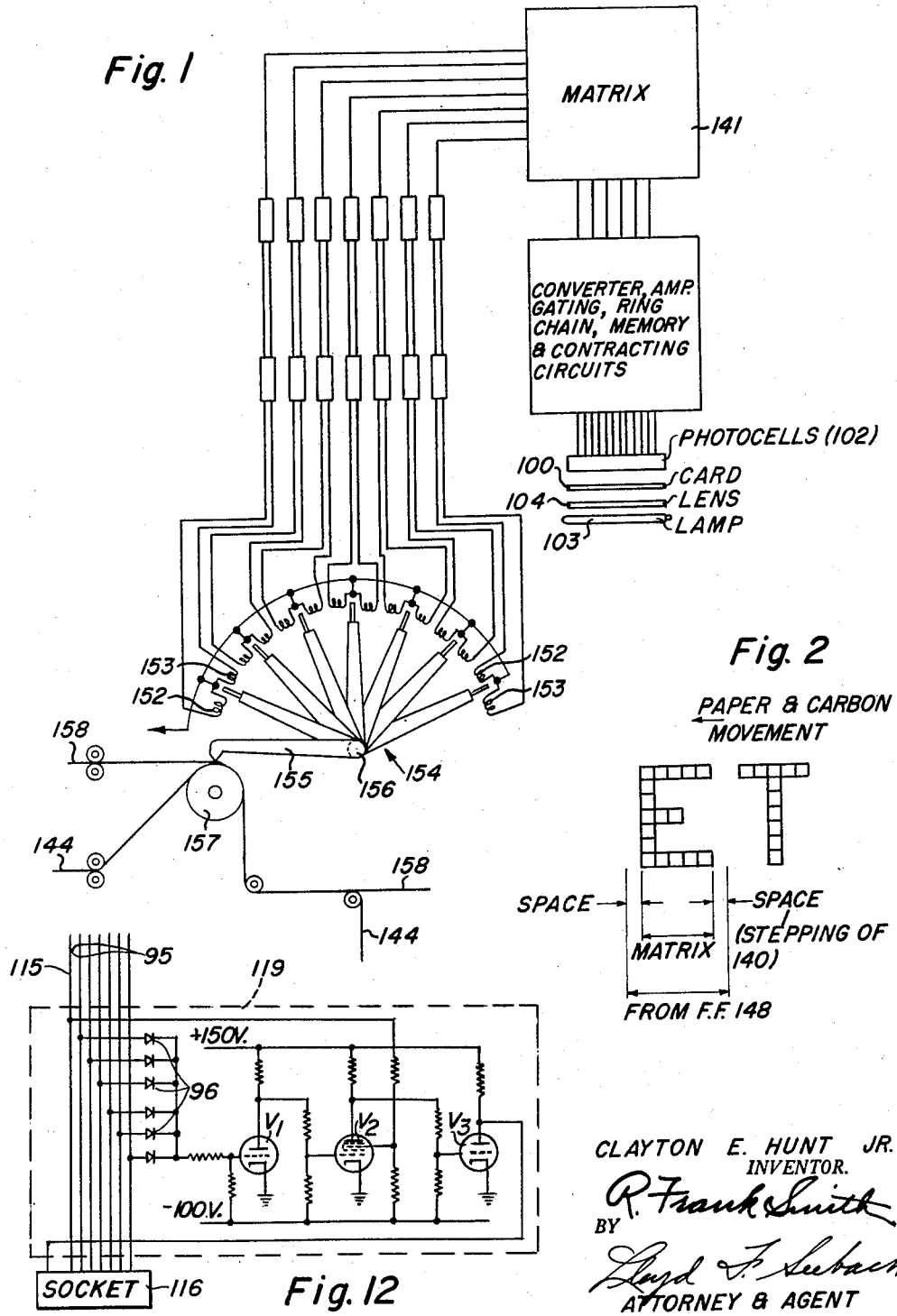

CLAYTON E HUNT JR.
INVENTOR.

BY R. Frank Smith

Lloyd F. Seebach
ATTORNEY & AGENT

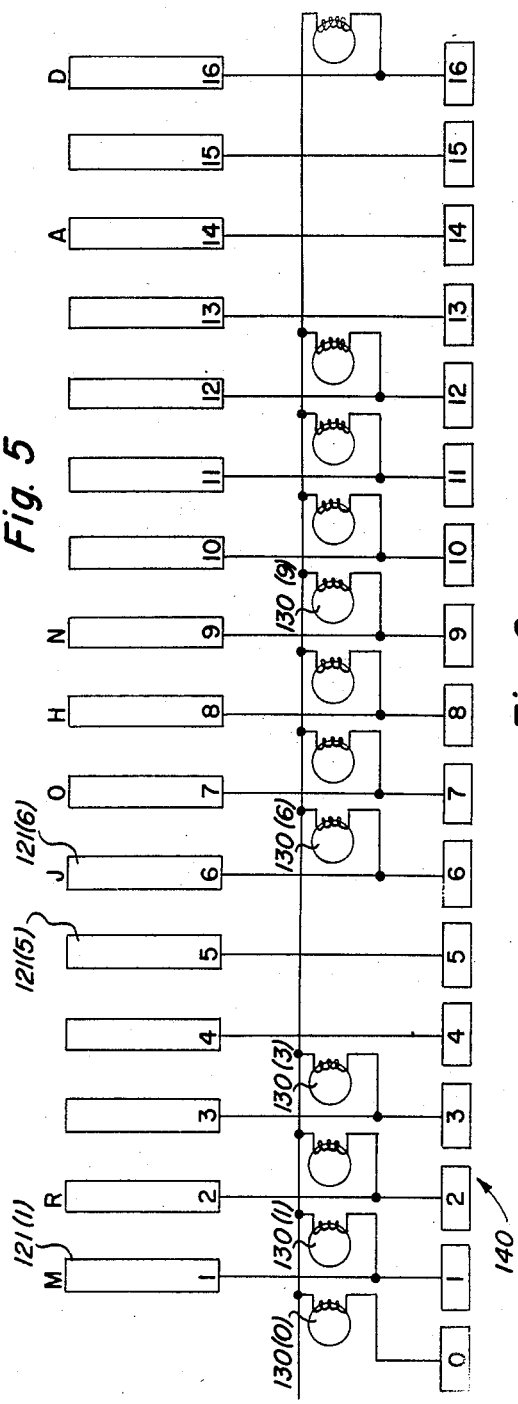
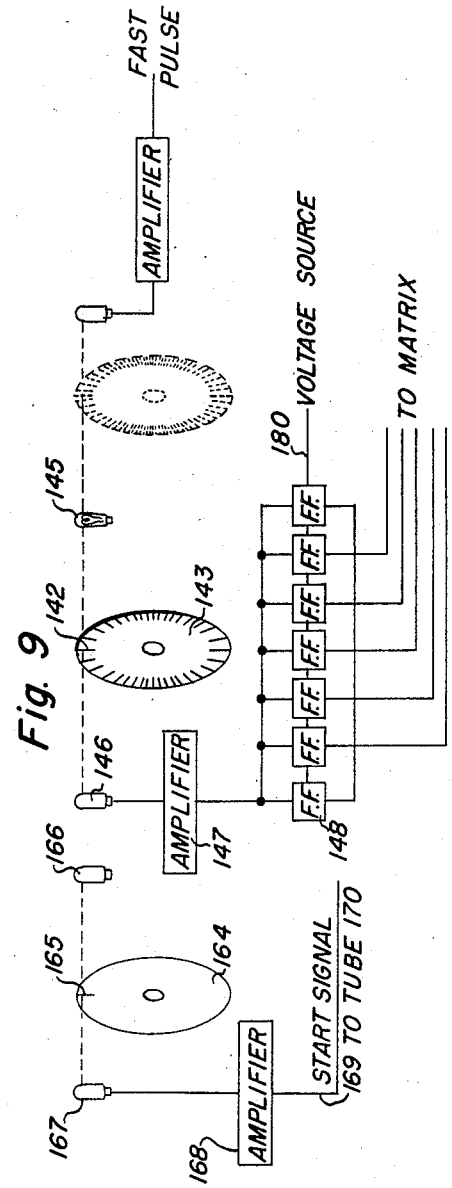

CLAYTON E. HUNT JR.
INVENTOR.

BY R. Frank Smith

Lloyd F. Seebach
ATTORNEY & AGENT

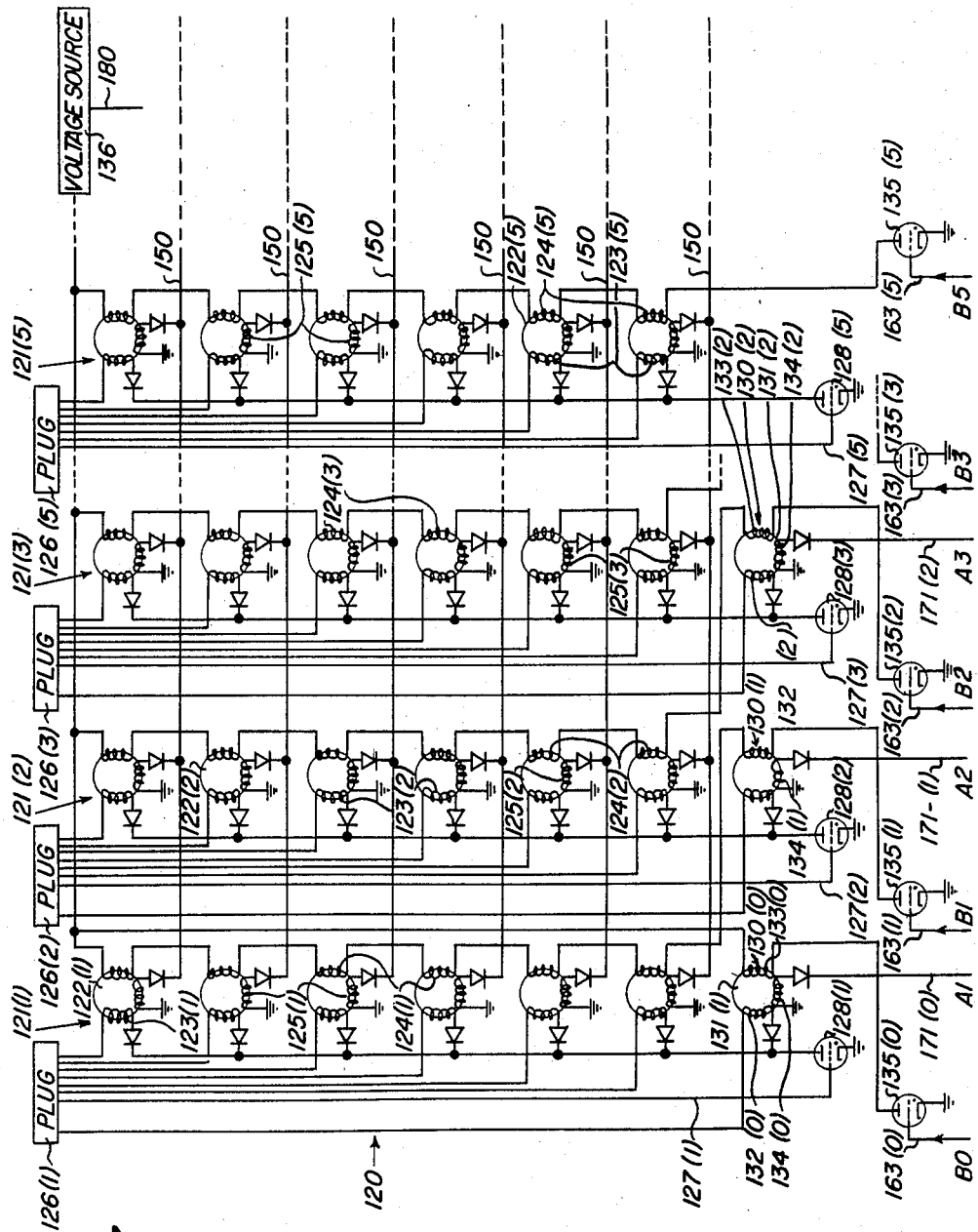

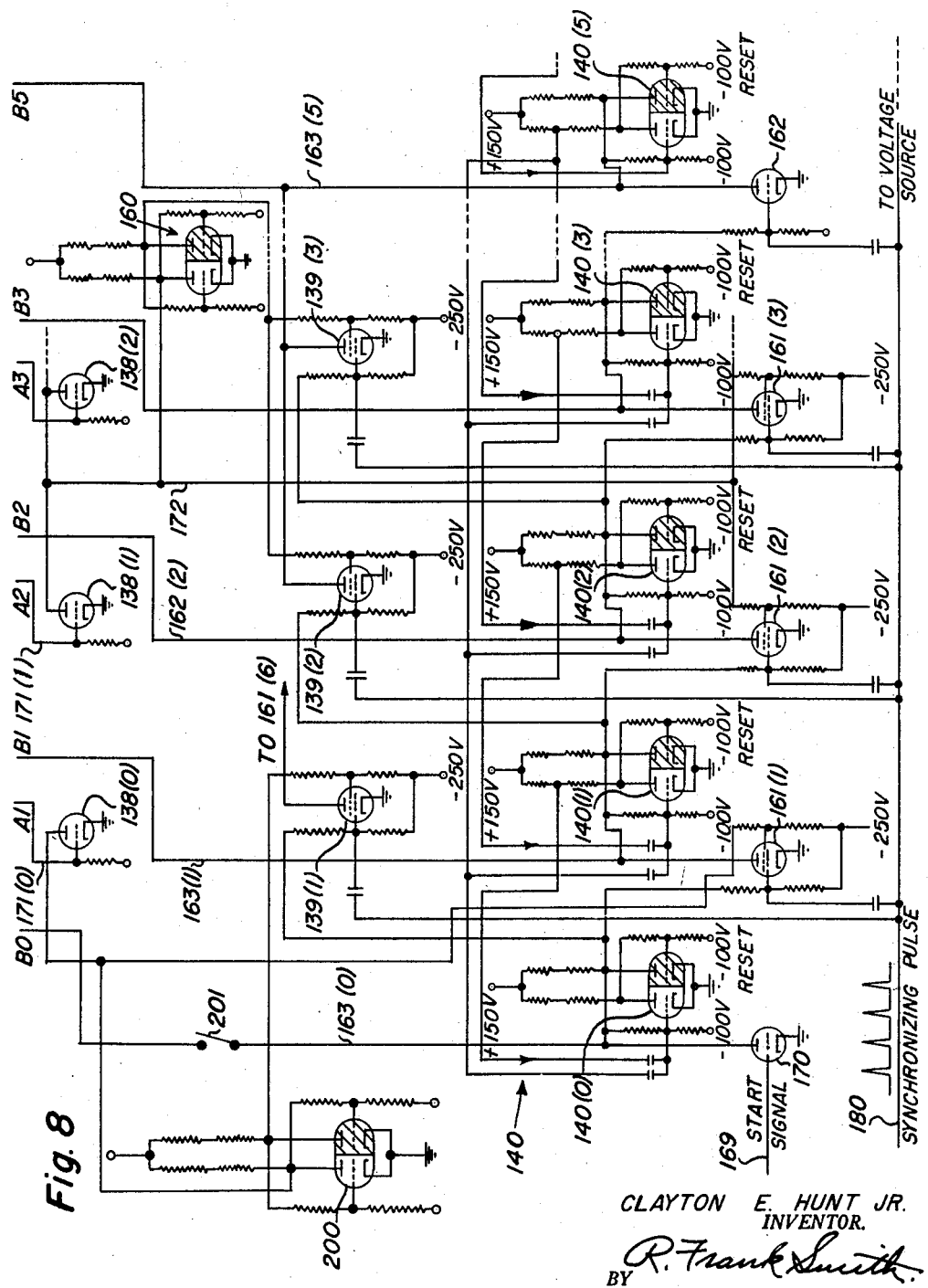

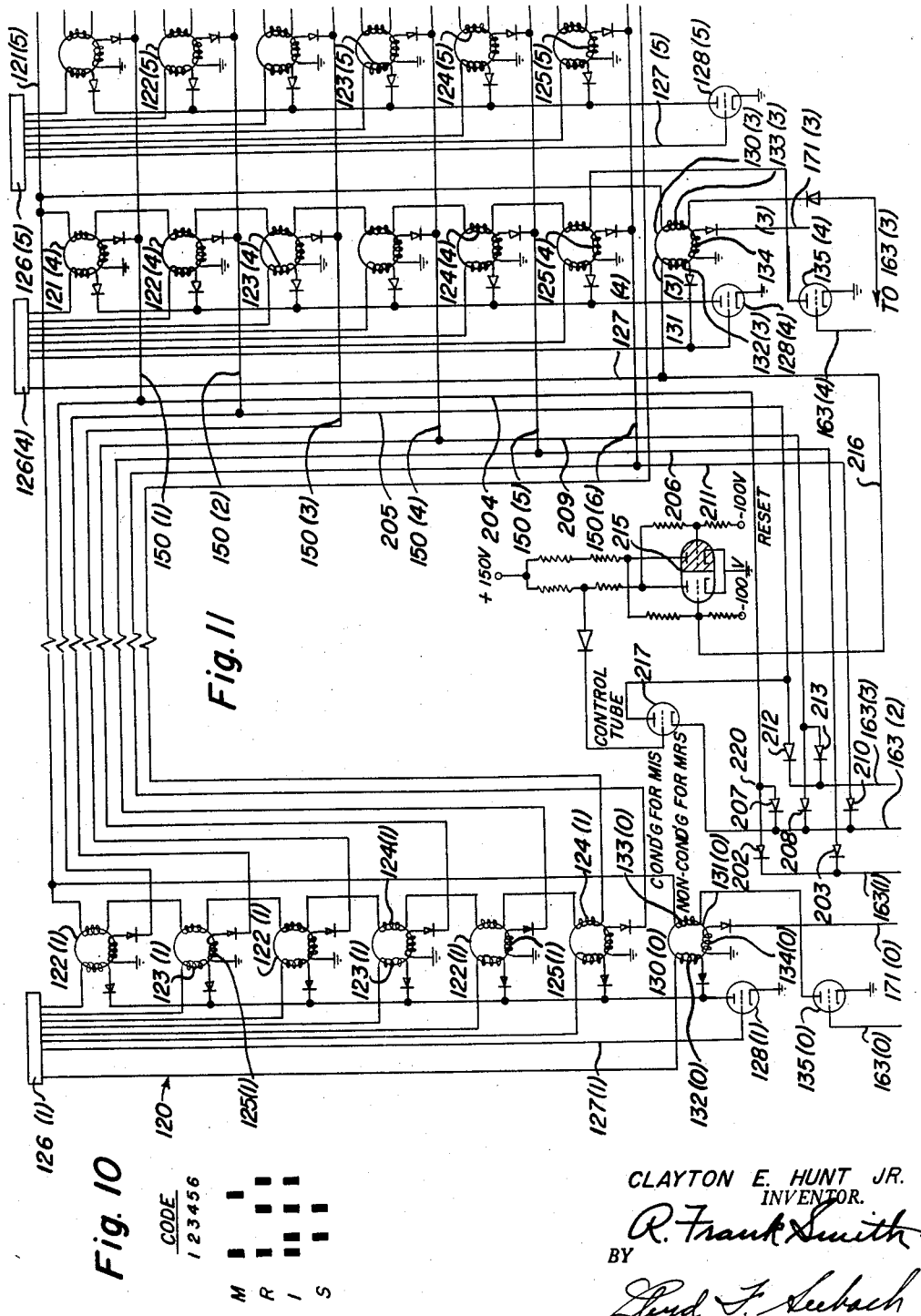

United States Patent Office 2,912,500
Patented Nov. 10, 1959

2,912,500

CONVERSION DEVICE FOR FACSIMILE APPARATUS

Clayton E. Hunt, Jr., Rochester, N.Y., assignor to Eastman Kodak Company, Rochester, N.Y., a corporation of New Jersey Application December 23, 1957, Serial No. 704,472

8 Claims. (Cl. 178—30)

The present invention relates to facsimile apparatus and more particularly to such apparatus as used for printing address labels from punched cards wherein means is provided to convert the different characters in the same area of successive cards into the same characters for each card and to reproduce the different characters in said same area only when said different characters correspond to a predetermined group of characters, this application being a continuation-in-part of my application Serial No. 614,258, filed October 5, 1956.

In U.S. Patent No. Re. 23,713 in the name of C. E. Hunt, Jr., U.S. Patent No. 2,659,652 in the name of Russell G. Thompson and in U.S. Patent Applications Serial No. 394,926 in the names of R. G. Thompson and C. E. Hunt, Jr., and Serial No. 474,169 in the name of C. E. Hunt, Jr., apparatus is described for deriving visual representations of characters on a medium from code arranged on cards in successive columns and representative of the characters. In such apparatus discrete cards are fed successively from a stack through a sensing station wherein the successive columns of code are analyzed for obtaining signals representative of the code. By circuit means these signals are converted into electrical signals which are utilized to energize either singly or in combination a plurality of recorders for producing a visual representation of the characters on the medium.

As is well known, the Hollerith system or IBM system utilizes a card having eighty vertical columns each with twelve possible code designations. For use in specific applications, a card may be divided into sections, or groups of columns, known as areas or fields which define that portion of the card in which information of a certain kind will always appear. The Remington Rand card has ninety vertical columns each with six possible code positions. The card is divided into an upper and lower section, each section extending across the length of the card to provide forty-five columns and six positions in each section. Each section may also be divided into areas or fields in which certain information can be recorded.

Irrespective of the type of card employed, it has been the practice heretofore to provide separate cards for each individual even though the title would be the only difference between two otherwise identical cards. For example, if a mailing list comprised a group of masculine names with titles preceding the name, such as MR, DR, REV etc., and it were desired to make a mailing to only the related female residing at the same address, it would be necessary to provide an entirely new group of cards in which only the titles would vary. If the complete mailing group includes female as well as male titles, for example MR, MRS, MISS, HON, REV etc., then it would be necessary to first separate the male and female titles and provide additional cards for the male group. However, this procedure does not permit the original file group of cards to remain intact and requires that a collating step be included in order to return the file to its original state.

By the present invention, the disadvantages of the aforementioned procedure is overcome in that the file is maintained intact and the mailing can be in accordance with titles on the cards or converted into another group of characters. This is accomplished, when a female list is to be prepared, by deriving signals from a diode matrix rather than from the card itself. In the embodiment of the invention shown, a memory unit is provided for each code column as well as an auxiliary memory. However, a diode matrix is provided to replace the memory units associated with the code columns to be converted. The card is scanned in the usual manner and the signals derived therefrom are stored in the memory means. A ring chain which is pulsed by periodic pulses causes read-out of the stored signals to cause activation of the corresponding recording members. Since the code columns to be converted are not connected to any memory means, the periodic pulses cause the diode matrix to release a predetermined signal in accordance with the read-out of the corresponding code column.

If, as described above, the conversion is to be a mailing to females, then the memories corresponding to the code columns for M, R and S in the area associated with the titles are not plugged. The diode matrix is devised to provide signals corresponding to M, R and S irrespective of the title appearing on the card in the title area. As a result, M, R and S will be printed for any title, such as MR, DR, HON, REV, etc., which comprises three or less characters. The diode matrix will automatically provide signals corresponding to MRS when this title appears on any card in the title area. In order to provide for a MISS title, the fourth character is read into the memory means associated with the fourth code column. A control circuit which is responsive to signals in the memory and auxiliary memory associated with the fourth code column automatically switches the output of the diode matrix, when a signal is read into the fourth memory unit, to provide signals corresponding to MISS. With this arrangement any three or less characters designating a title are automatically printed as MRS and when the title MISS is read in from any card, this same title is automatically printed.

The primary object of the invention is, therefore, to provide a device for facsimile apparatus by means of which any group of different characters in the same area of a card will be converted into the same characters and a predetermined group of characters in said same area will be reproduced as originally presented.

Another object of the invention is to provide a device for facsimile apparatus in which a diode matrix normally provides output signals representative of the same characters and in accordance with the read-out of code columns of a particular area in which different characters are represented and which provides output signals representative of a predetermined group of characters and in accordance with the read-out of code columns of a particular character in which said same group of characters are represented.

And still another object of the invention is to provide a device for facsimile apparatus including a diode matrix which is capable of providing two series of successive signals, one series being representative of the same characters and the other being representative of a predetermined group of characters, and means for controlling the output signals of the diode matrix in accordance with the characters sensed in a particular area of each card wherein each character is represented by code arranged in successive columns.

These and other objects and advantages will be apparent to those skilled in the art by the description which follows.

Reference is now made to the accompanying drawings wherein like reference numerals designate like parts and wherein:

Fig. 1 is a diagrammatic view of the printing apparatus showing the means for deriving the electrical signals from the punched cards and the recording elements actuated by said signals;

Fig. 2 is an enlarged view of two characters as reproduced by the recording elements and showing the formation of said characters from a 5 x 7 dot rectangle;

Fig. 5 is a schematic view showing the arrangement of the auxiliary memory with respect to the memory and ring chain units associated with each column on the card;

Fig. 7 is a schematic view of a portion of the circuits comprising the memory system;

Fig. 8 is a circuit diagram of a number of units of the ring chain for read-out of the signals stored in the memory system;

Fig. 9 is a detail view of the means for providing periodic pulses to the ring chain shown in Fig. 8;

Fig. 10 is a representation of the code signals delivered by the diode matrix;

Fig. 11 is a schematic view of a portion of the circuits comprising the memory system and the diode matrix and control circuit therefor; and Fig. 12 is a detail circuit diagram of one of the circuit associated with the distribution means.

The apparatus to be described for the purpose of disclosing the invention has been designed to record or print all characters with a definition in height of seven lines and with five-line definition in width, see Fig. 2. More or fewer lines may be employed as desired, but it is believed that seven-by-five definition gives the lowest resolving power which can be tolerated when it is desirable to print characters which are easily legible. For printing characters as well as digits, a six element binary code for the coded signals is preferred. These signals may originate in any manner but the invention contemplates their derivation from a medium such as punched tabulating cards. Any other code, of course, may be used as long as it meets the requirement that unique voltage patterns can be derived from each coded character signal.

Card feeding mechanisms for moving cards with respect to a sensing means as well as advancing means for recording tapes or mediums are so well known that a detailed description thereof is deemed to be unnecessary.

Figure 3:
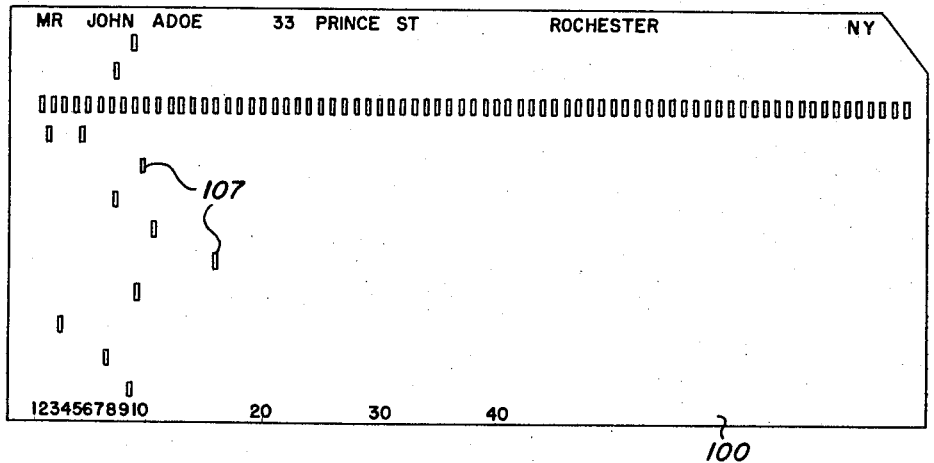
Fig. 3 is a detail view of a punched card showing the division of the card into areas for each portion of the name and address.
Figure 4:
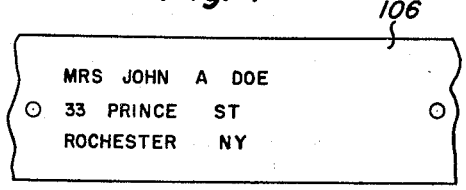
Fig. 4 is a detail view of an address label.
Figure 6:
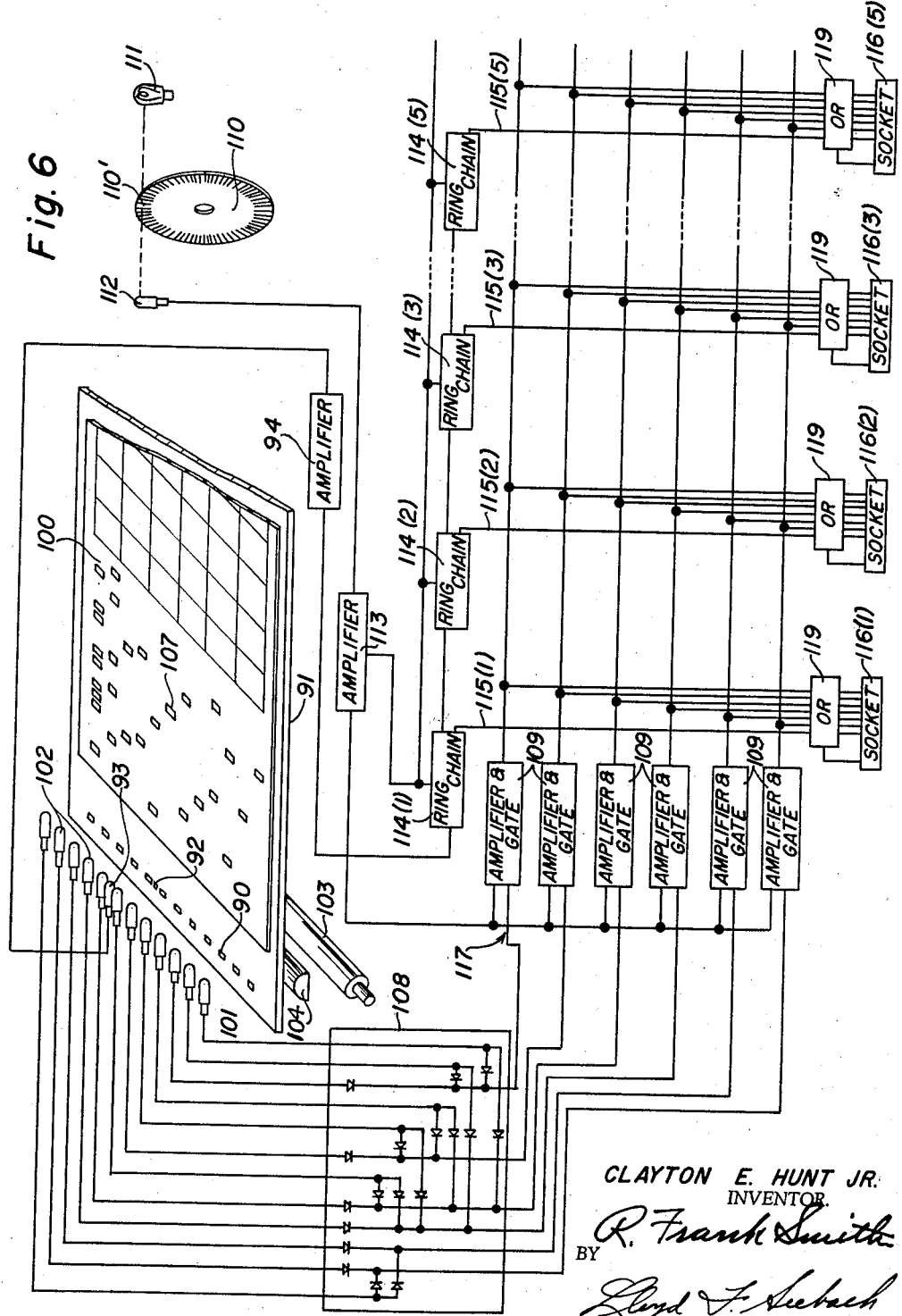
Fig. 6 is a schematic diagram of the apparatus and circuits for receiving and distributing the coded signals divided from the punched cards.

With reference to Figs. 1, 3 and 6, the punched card 100 is divided into areas or fields in which the title, first name, middle initial, surname, etc., appear in successively coded columns by perforating the card in a well-known manner. Cards 100 are fed from the bottom of a stack in a lengthwise direction and at a constant speed into a scanning station 101. For the type of card shown, a group of light-responsive cells 102 are arranged above and across the path of card movement, said group being spaced above the card and aligned with apertures 90 in plate 91 over which cards 100 are moved so that the name, address and city and state can be read successively as the card is moved through the scanning station. Lamp 103 and lens 104 are arranged on the under side of the plate 91 in alignment with apertures 90 and cells 102, lens 104 serving to spread the light from lamp 103 to provide uniform illumination for each column as it is scanned. Since the cards are moved continuously through scanning station 101 and past cells 102, the number of cells 102 energized in each row will vary with the code permitting light to be transmitted through apertures 90 and will provide signals which are individual to the character represented by the code. Also, since the printing of the lines on the address label occur simultaneously, the description which is to be given with respect to the first line is to be understood as also being applicable to the other two lines. Although a single set of cells 102 is utilized for reading the code on the entire card, each area of the card is associated with a memory and printer for the respective line. As a result, the code for each area is read successively into the memories but on read-out, each area is read out simultaneously.

As is well known, the areas or fields of a punched card must be sufficiently large to accept some predetermined number of characters or digits in accordance with past experience. For example, the title preceding a name may be M, MR, MRS, MISS, DR, HON, REV, etc., and from these it is evident that the number of characters vary from one to four. In the same manner, any one of the other groups such as the first name, surname, street number, etc., can vary and provision for this variation must be made. However, if no provision is made, then a label is obtained in which the spacing between groups of characters and/or digits vary in accordance with the spacing of the corresponding lines of code on the card. Since an address label is of a fixed length, it is possible to have one group of characters appear in the area of the next label. By means of my invention disclosed in U.S. Patent application Serial No. 704,410 filed December 23, 1957, the spacing between groups of characters and/or digits can be made uniform.

As shown in Fig. 6, the pulses obtained by light transmitted through apertures 107 in cards 100 and onto cell 102 are directed to a conventional circuit 108 of diodes which converts the pulses for each column of code to signals representative of a binary-six code which, in turn, are delivered to the corresponding amplifier and gating circuits 109, which can be of the Rossi type shown in the text "High Speed Computing Devices" published by McGraw-Hill Book Company. In order to insure synchronization of the card feed and the successive scanning of the lines of code on card 100, a disc 110 is provided with a number of radial slots 110' equivalent in number to the number of columns on the card and is geared or directly connected to the card feed. A light source 111 is arranged on one side of the disc 110 and a light responsive cell 112 on the other side thereof. The light transmitted through a slot 110' and falling on cell 112 provides a pulse which is utilized as a synchronizing signal for each card column passing the row of cells 102. The signals from cell 112 are delivered to amplifier 113 which, in turn, delivers the amplified signal to each of amplifier and gating circuits 109. As shown in Fig. 6, the circuits 108 and 109 are common to each column on card 100 but are shown only in conjunction with the first few columns of card 100 associated with the first line on the address label; however, circuits 109 are also associated with each of the other card columns. Each signal from amplifier 113 is, therefore, connected to each of circuits 109. The signals from cells 102 which are converted by circuit 108 are gated by the signal from amplifier 113 to make short pulses. The signals from amplifier 113 are also directed to ring chains 114 which are equivalent in number to the number of code columns on card 100 and have the property of being stepped along by the signal from amplifier 113 so that output pulses are delivered successively to leads 115 connected to sockets 116, each of sockets 116 corresponding to a code column on the card. In an arrangement, as shown in Fig. 6, the code columns on the card are scanned or sensed. Each signal or group of signals derived from a column will be stepped by the single disc 110 and ring chain 114 to its respective socket 116.

The code distribution means or circuit 117 receives a start signal when a card is in a predetermined relation to scanning station 101, that is, at a time when the last column of code in the preceding card is past cells 102 and the first column of code in the next and succeeding card is approaching cells 102. This is accomplished by providing an aperture 92 in plate 91 which is arranged between any two of apertures 90. Aperture 92 is then covered and uncovered by the leading and trailing edges of each card moved into reading station 101. A light responsive cell 93 is aligned with aperture 92 and provides a signal which is delivered to ring chain 114(1) as a start signal by amplifier 94. Cells 102 derive a signal or a group of signals from the perforations in each code column as the card passes thereunder and these signals which are based on the IBM system, are converted by circuit 108 into a binary-six group of signals. The signals from circuit 108 are amplified and gated with the disc signal to insure exact synchronization and are delivered to socket 116. As a result, an electrical signal representative of the character coded in each column of card 100 is posted on one or more of the terminals of each socket 116 successively. Since each character or digit will be represented by the energization of a different combination of cells 102 associated with each section of card 100, the signals will be applied to the teminals on sockets 116 corresponding to the converted combination of said cells.

Memory means 120, as shown in Fig. 7, comprises a plurality of static magnetic memory units 121 having cores 122, read-in coils 123, read-out coils 124 and output coils 125. Each of the units is arranged in assemblies or groups of six units in accordance with the number of bits in the binary code and each group is associated with one of the code columns on card 100, the number of groups being equivalent to the number of code columns in each section. Each memory unit has the property that a pulse in coil 123 will magnetize core 122 in one direction and a pulse in coil 124 will magnetize the core in the opposite direction, coil 125 having an output only when the direction of magnetization is reversed. With reference to Fig. 6, it will be noted that an Or circuit 119, see Fig. 12, is provided between each of sockets 116 and circuit 117. The sockets 116 are engaged by plugs 126 and coils 123 are connected thereto for receiving any signal delivered to its respective terminal on socket 116 and lines 127 are connected in each instance to the control grid of thyratrons 128.

Or circuit 119, as shown in Fig. 12, comprises tubes V1, V2, and V3 which are interconnected to the output lines of circuit 109 and ring chain 114. Signals appear on one or a combination of lines 95 in accordance with the character read and no signal appears when a code column is unpunched, thereby indicating no character in that particular line. A synchronizing signal derived from ring chain 114 appears on line 115 in coincidence with signals on any one or more of lines 95, if any. If a signal appears on any one or more of lines 95, such signal or signals will be transmitted by diodes 96 to render tube V1 conducting. The output from tube V1 will then be a negative pulse applied to one grid of the dual control tube V2 to render it nonconducting regardless of the synchronizing signal applied to the other grid via line 115. Thus, there is no output to tube V3 and no signal is applied to auxiliary memory read-in coil 132. If none of lines 95 contains a signal, thereby indicating absence of a character in that particular code column, V1 is held nonconducting and its output holds one grid of tube V2 in a conducting position. A signal on line 115 therefore renders the other grid conducting to permit tube V2 to conduct and apply a negative pulse to the grid of tube V3 which inverts the pulse to apply a positive pulse to auxiliary memory read-in coil 132. Although such a circuit is shown in conjunction with each of ring chains 114 corresponding to a code column, a single Or circuit 119 can be utilized in a manner similar to circuits 109.

An auxiliary memory means 130 comprising a core 131, read-in coil 132, read-out coil 133 and an output coil 134 is associated with each group of memory means 121 into which a signal may possibly be read. The read-in coil 132 has one side thereof connected to Or circuit 119 via plug 126 and socket 116 and the other side connected to the anode of thyratron 128. Read-out coil 133 is serially connected with the read-out coils 124 associated with the preceding memory unit, the anode of thyratron 135 and voltage source 136. Output coils 134 have one side thereof connected to ground and the other side connected by line 171 to the grid of control tube 138, see Fig. 8. As shown schematically in Fig. 5, each of auxiliary memories 130 is associated with a unit of memory means 121 and a unit of a second ring chain 140 which controls the read-out of any signals stored in the memory units.

Fig. 9 discloses means for providing periodic pulses to ring chain 140 and to matrix 141, as described hereinafter. A revolving disc 142 provided with slots 143 and synchronized with the movement of tape 144 in the printer has a light source 145 arranged on one side thereof and a light responsive cell 146 on the other side, the cell 146 being energized by the light transmitted through the slots. The synchronization is such that for each character seven pulses are delivered by cell 146. These pulses are amplified by circuit 147 and delivered to ring chain 140 by means of seven flip-flop circuits 148 which are connected so that pulses are sent from each in turn. Flip-flop circuits 148 are substantially the same as the units of ring chain 140 disclosed in Fig. 8, and differ only in number, that is, circuit 148 comprises seven units whereas ring chain 140 has twenty-seven units. Five of these pulses are utilized to sequentially operate the printer and the seventh is utilized to step ring chain 140 once for every seven pulses and to pulse a voltage source, also note Fig. 2. Since each unit of chain 140 is connected to the control grid of its respective thyratron 135, energization of read-out coils 124 is also controlled by ring chain 140.

If for each column scanned, signals are delivered into one or more of read-in coils 123 of each group and read-out coils 124 are pulsed at any time thereafter, a signal is induced in each output coil 125 of the unit in which the direction of magnetization has been changed by the read-in coils. As a result, an electrical signal is applied to the respective common output leads 150. The delivery of a signal to any one of read-in coils 123 in a group blocks Or circuit 119 and no signal is delivered thereby to the auxiliary memory 130 associated with the memory group of the next code column. If no signal is supplied to Or circuit 119, then this circuit delivers a signal to the auxiliary memory 130 of the next code column. If any of read-in coils 123 are not pulsed by a signal from distribution circuit 117 and read-out coils 124 are pulsed later, no signal will be induced in the output coils of such group. Successive groups of signals corresponding and individual to the characters to be printed are, therefore, sent out over lines 150.

The signals on output leads 150 are delivered to a group of flip-flop circuits which, in turn, deliver signals to a decoding circuit, then to a synthesizing circuit and to a matrix circuit 141, see Fig. 1. The signals delivered by the matrix 141 are delivered to coils 152 and 153 of magnetic driver 154 to actuate a plurality of stylii 155 which are pivotally mounted on a common axis 156 for movement either singly or in combination toward platen roll 157. Tape 144 is advanced from a supply source together with carbon paper 158 and then separated beyond platen roll 157. For a more detailed description of the apparatus described, reference can be made to the above-mentioned patents and patent applications.

With respect to Fig. 8, ring chain 140 comprises a number of flip-flop circuits 140(0), 140(1), etc., which are normally conducting on the right hand side. Associated with these circuits are control tubes 138(0), 138(1), etc., control tubes 139(0), 139(1), etc., and flip-flop circuits 160 and 200 which are also conducting on the right-hand side. The circuits disclosed in Fig. 8, show the arrangement and interconnections required for providing a predetermined spacing, in this instance a space equivalent to one character, between the last character in the title and the first character in the first name as disclosed in my above-mentioned copending application. It is to be understood that this same arrangement can be used between the other groups of characters in the other sections of card 100 in the present invention. As shown in Fig. 5, the M appears in memory unit 121(1), the R in memory unit 121(2), and the J in memory unit 121(6).

If it is assumed that an eighty column card is to be used, that the cards are moved with the equivalent of the space between two code columns between successive cards, and that the card is to be divided into three sections, then each section can comprise twenty-five columns of code and each section will be separated by two columns in which no code will appear. The number of units in ring chain 114 will number eighty-two and the number of units in ring chain 140 will number twenty-seven in accordance with the number of character spaces between successive perforations in tape 144. Ring chain 114 is, therefore, associated with the number of code columns on card 100 and ring chain 140 is associated with the number of character spaces on the label, a maximum of twenty-four characters being capable of being printed on such label.

As described above, the leading edge of the card entering the scanning or sensing station covers aperture 92, thereby resulting in a signal to ring chain 114 to render it operative in timed relation to the read-in of signals for storage in memory means 120. The flip-flop units of ring chain 140 are normally conducting on the right-hand side, and the bias on tubes 161 and 162 is such that they are biased far beyond cut-off so that the periodic pulses on line 180 from disc 142 have no effect. The anode of tube 170 is connected by line 163(0) to the control grid of thyratron 135(0) and to the anode of the normally nonconducting side of flip-flop 140(0). The signal delivered to tube 170 as a start signal is derived from disc 164 having a single slot 165 and which is rotated together with disc 142, as shown in Fig. 9. Disc 164 is arranged between light source 166 and photocell 167, the signal being derived from the light transmitted through slot 165 and falling on cell 167. This signal is then amplified by any conventional amplifier circuit 168, and the amplified signal is directed by line 169 to the grid of tube 170. While the number of units in chain 114 and chain 140 are different in number, the time required for each chain to complete its cycle is the same. However, chain 140 cannot start the read-out until after the first character in the last section has been read-in and must be started before the last character in this section has been scanned, by this arrangement read-in and read-out can be occurring at the same time. This delay in read-out is necessary so that all three lines on the label can be printed simultaneously. It is also possible to read-out only after all sections have been read-in. The signal delivered to tube 170 by disc 164 is synchronized so that tape 144 is positioned to receive the first character in the tape in proper spaced relation to the perforation in the tape. This is accomplished by starting movement of the tape before read-out of the character signals stored in memory 120 and is described more fully in my above-mentioned patent application.

Assuming that memory 121(1) has signals stored therein, the pulse on line 180 to voltage source 136 and which follows the start signal on line 169 causes a pulse to be delivered from said voltage source to read-out coils 124(1) which, in turn, causes the direction of magnetization in any of cores 122(1) in which a signal has been stored by read-in coils 123(1) to be reversed. As a result, the corresponding output coils 125(1) will deliver an electrical signal to the corresponding lines 150. At the same time, the pulse from voltage source 136 will be applied to read-out coils 133(1) of auxiliary memories 130(1). If it is assumed that signals corresponding to M were read into cores 122 (1) corresponding thereto and corresponding to R were read into cores 122(2), then Or circuit 119 will not have delivered any signal to either of auxiliary memories 130(0), 130(1) or 130(2). As a result, no signal will be delivered by output coils 134(0) of auxiliary memory 130(0) nor will any signal be derived from output coils 134(1) and 134(3) of auxiliary memories 130(1) and 130(2).

The slot 165 in disc 164, which is rotated with disc 142, is arranged between two of the slots 143 in disc 142, in order to provide a start signal which will be impressed on the grid of tube 170 between any two successive pulses derived from disc 142 and delivered to line 180. The signal delivered to tube 170 via line 169 renders this tube conductive and the decrease in plate potential causes thyratron 135(0) to fire. The conduction of tube 170 also causes flip-flop 140(0) to switch, the switching causing tube 161(1) to be rendered receptive to the first pulse appearing on line 180. Conduction of tube 135(0) impresses a pulse in read-out coil 133(0) and if a signal has been delivered to any one or any combination of memories 121(1), Or circuit 119 will not have delivered a pulse to read-in coil 132(1) and no signal will be derived from output coil 134(0). On the other hand, if no signal has been delivered to any of memories 121(1), the Or circuit 119 will have pulse read-in coil 132(0) and a signal will then be derived from output coil 134(0) to cause tube 138(0) to become conductive. Conduction of tube 138(0) results in flip-flop circuit 200 being switched and tube 161(1) being returned to its normal condition in which it is biased far beyond cutoff. The switching of flip-flop 200 also causes tube 139(1) to become conducting and it, in turn, renders tube 161(6) receptive to the first pulse appearing on line 180 after the start pulse on line 169. This first pulse on line 180 causes tube 161(6) to become conductive and read-out of memory 121(6) then occurs first. By this arrangement auxiliary memory 130(0) determines whether read-out of the signals will commence with memories 121(1) or 121(6). Since the first letter of the title, first name, etc. will be coded in the first column of its respective field or area, there is the possibility that the title in the first line to be printed may not be punched in some of the cards. This circuitry will be more fully understood from the description which follows with respect to the read-out of the signals from the other stages of the memories 121 in which there has been no omission of the title. It is to be understood that the circuitry which is disclosed in Figs. 8 and 9 and which comprise the tubes 138(3), 139(3), 140(3), and 161(3) is also associated with memory 121(4) and is not shown in either of these two figures of the drawings.

The decrease in plate potential of tube 170 causes the left-hand side of tube 140(0) to become conducting and the right-hand side to become nonconducting. This switching of tube 140(0) causes the bias on tube 161(1) to be reduced to render it receptive to the first pulse on line 180 following the start signal on line 169. This pulse on line 180 is blocked from all of tubes 161 with the exception of tube 161(1) and renders this tube conductive, the reduction in plate potential causing thyratron 135(1) to fire whereby a pulse initiated by the pulse in line 180 causes read-out coils 124(1) to induce signals in output coils 125(1) which are delivered to the lines 150 corresponding to the signals stored in cores 122(1) and which are individual to the character M.

The pulse to read-out coils 124(1) is also directed to read-out coil 133(1) of auxiliary memory unit 130(1).

Since a character has been read into memory 121(2), that is, for the letter R, Or circuit 119 will not have delivered a signal to read-in coil 132(1). As a result, with the read-out of memory 121(1), no signal is delivered by output coil 134(1) to the grid of control tube 138(1) via line 171(1).

The conduction of tube 161(1) also causes flip-flop circuit 140(1) to switch, this switching rendering tube 161(2) receptive to the second pulse on line 180 and resetting flip-flop 140(0) to its normal condition. The second pulse on line 180 is, therefore, received only by tube 161(2) and renders this tube conductive, flip-flop 140(1) being switched to its normal condition and tube 161(3) being rendered conductive to the third pulse on line 180. Conduction of tube 161(2) renders tube 135(2) conductive whereby a pulse is delivered to read-out coil 131(2) of auxiliary memory 130(2) and to read-out coils 124(2) of memory 121(2). The output coils 125(2) then deliver signals corresponding to the letter R to the corresponding lines 150. Since no signals have been delivered to memory 121(3), Or circuit 119 has delivered a signal to read-in coil 132(2) of auxiliary memory 130(2), thereby designating the lack of any signals in memory 121(3). As a result, the change in magnetization in core 131(2) by read-out coil 133(2) induces a signal in output coil 134(2) which renders tube 138(2) conductive. The decrease in plate potential of tube 138(2) causes the left-hand side of flip-flop circuit 160 to become conducting and the right-hand side nonconducting.

With the conduction of tube 161(2) as stated above, the conduction of flip-flop 140(2) is switched so that tube 161(3) is rendered receptive to the third pulse on line 180 and flip-flop 140(1) is reset to its normal state. The anodes of tubes 138 are connected to the suppressor grids of tubes 161 via line 172 as well as to the left anode of flip-flop 160. As a result, whenever one of tubes 138(1), (2) or (3) is made conductive, one of tubes 161 has already been made receptive to a pulse on line 180. This tube is however, again reverted to its blocking condition and the preceding flip-flop 140 is switched to its normal condition. Also, since flip-flop 160 was switched by conduction of tube 138(2), the bias on tubes 139 is reduced so that the third pulse on line 180 is delivered to tubes 139 and the output thereof is delivered to line 163(5). The output from tubes 139 causes flip-flop 140(5) to switch whereby the next control tube 161(6) will be rendered receptive to the fourth pulse on line 180 as well as causing read-out of any signals in the memory units associated with the fifth column of code. As shown in Figs. 3 and 6, memory 121(5) corresponds to a blank line to provide the necessary space between the last character of the title and the first character of the first name. Accordingly, no signals will have been read into memory unit 121(5) and a space corresponding to a single character will appear on the label between the R and J rather than three such spaces.

From the foregoing description and drawings, it is evident that flip-flop circuit 160 is connected to both control tubes 139 and 161 so that in the normal state of said circuit, control tubes 161 and 162 are responsive to the signals on line 180 and when flip-flop 160 is switched by a signal read-out of any one of auxiliary memories 130, control tubes 139 are operative and tubes 161 are not. Referring to Figs. 5, 7 and 8, as one of flip-flop circuits 140 is switched by a pulse on line 180, the corresponding memory 121 is read-out together with the auxiliary memory 130 associated with the next code column. If a signal is stored in the memory next to the one being read-out, flip-flop circuit 160 will not be switched. However, if the next memory unit has no signal stored therein, then Or circuit 119 will have read a signal into the auxiliary memory. The next signal on line 180 is, therefore, directed by tubes 139 to the code column associated with the blank code column between the groups of characters. In the above description, if the title had been MRS instead of MR, there would have been no signal in auxiliary memory 130(2) when memory 121(2) was read out because the "S" would have been read into memory 121(3). However, a signal would then have been derived from auxiliary memory 130(3) upon read-out of memory 121(3) and the succeeding pulse would then have been directed to memory 121(5) instead of providing for read-out of memory 121(4) which is not showing in Figs. 7 and 8. In the event the title comprises four letters, such as MISS, switching of flip-flop circuit 160 cannot occur and flip-flop circuit 140(4) will then render tube 162 receptive to the fifth pulse on line 180 for read-out of memory 121(5). This will result in a space occurring between the last "S" and the first name on the label since no signals are stored in memory 121(5). For this reason, each area of card 100, with the possible exception of the first area associated with each line to be printed, is plugged so that memories 121 will provide a code column in which no code is recorded or stored in order to obtain a spacing between the characters in two adjacent areas associated with the same line. For example, as just described and shown in Fig. 5 for first line of label 106, memories 121(5), 121(13) and 121(15) will not be plugged to sockets 116 so that this spacing will exist irrespective of the arrangement of the code on card 100. By this arrangement, two characters, such as the middle initial A and the first letter D of the last name, can be separated by proper plugging of memories 121 with respect to distribution means 117 since read-in of the signals to memories 121 occurs before read-out. In this instance, signals representative of A will be read into memory 121(14) and signals representative of the D and immediately following those of A will be read into memory 121(16). Memory 121(15) will, therefore, not be plugged into distribution means 117 and will have no signals stored therein on read-in. On read-out of magazines 121, however, memory 121(15) will provide the space between the letters A and D when printed on the label.

A similar arrangement of control tubes 138 and 139 together with a flip-flop circuit 160 is arranged in the same manner with respect to the other groups of characters, such as, first name, surname, number, street, city and state. In each instance the space between the last character in one group and the first character in the next group is the space equivalent to one character. It should be understood, of course, if more than one such space is required, it is merely a matter of adopting the circuitry just described to obtain any desired predetermined spacing.

While the foregoing description is directed to the read-out of the signals in memory means 120 and the establishment of a predetermined spacing between the last and first characters in adjacent sections or fields of card 100, it is believed that this description will simplify and make the description of the invention which follows more readily understood. With reference to Figs. 7, 8 and 11, it will be noted in Fig. 11 that although memory 121(1) is shown and memories 121(2) and 121(3) have been omitted, as well as auxiliary memories 130(1) and 130(2), these units are not plugged into their respective sockets 116. In addition, line 163(0) is broken by switch 201. As a result, the control means comprising tube 138(0), 139(1) and flip-flop circuit 200 are cut out so that in the event no title is coded in the title section of card 100, a title is automatically inserted. Since most titles comprise two and possibly three characters, such as M, MR, DR, REV, HON, etc. the only title which may possibly contain four characters will be that of MISS.

For two and three character titles, therefore, signals will be derived from the columns of code on cards 100 as they are scanned but the signals will not be stored in memories 121(1), 121(2) and/or 121(3) because they have not been plugged to sockets 116. On read-out, however, the start signal on line 169 will render tube 170 conductive, thereby switching flip-flop circuit 140(0) and rendering tube 161(1) receptive to the first pulse on line 180. The anode of tube 161(1) is now connected by line 163(1) to a permanent diode group 220, as seen in Fig. 11. With reference to Fig. 10, it will be noted that M is designated by code bits 1 and 5; R by 1, 4 and 6; I by 1, 2, 4 and 6; and S by 2 and 4. This representation also indicates the lines 150 on which signals must appear to obtain an actuation of styli 155 and which will reproduce a visual representation of these characters. It is to be understood, of course, that other combinations of signals can be used to obtain the same characters and will require other changes in the contracting and matrix circuits, as will be readily uderstood by those skilled in the art.

By means of diodes 202 and 203 and lines 204 and 206, line 163(1) is connected to lines 150(1) and 150(5), respectively. In the same manner, line 163(2) is connected to line 150(1) through diode 207 and line 204, to line 150(4) through diode 208 and line 209, and to line 150(6) through diode 210 and line 211. Line 163(3) is connected to line 150(2) through diode 212 and line 213 and to line 150(4) through diode 214 and line 209. As described above, the periodic pulses on line 180, see Fig. 8, are normally blocked by tubes 161 and 162 because they are biased far beyond cut-off and are receptive to said pulses only when the preceding flip-flop circuit 140 has been switched. Since the start signal on line 169 has switched flip-flop circuit 140(0), tube 161(1) is receptive to the first pulse on line 180. This pulse causes tube 161(1) to become conducting thereby switching flip-flop 140(1) and rendering tube 161(2) receptive to the second pulse on line 180 and resetting flip-flop circuit 140(0) to its normal condition. Conduction of tube 161(1) also results in a signal voltage being delivered via line 163(1), diodes 202 and 203 and lines 204 and 206 to lines 150(1) and 150(5) which corresponds to the letter M. The second pulse on line 180 to tube 161(2) causes flip-flop circuits 140(1) and 140(2) to switch, tube 161(3) to be rendered receptive to the third pulse on line 180 and a signal voltage to be delivered via line 163(2) through diodes 207, 208 and 210 to lines 150(1), 150(4) and 150(6) which corresponds to the letter R. The third pulse on line 180 results in switching of flip-flop circuits 140(2) and 140(3), tube 161(4) being rendered receptive to the fourth pulse on line 180 and a signal voltage to lines 150(2) and 150(4) which correspond to the letter S. As a result, the diode group 220 causes the letters M, R and S to be automatically printed on each label irrespective of any two or three character titles which may be coded on the cards.

With reference to Figs. 8 and 11, if no signal is read into memory 121(4), Or circuit 119 will have pulsed read-in coil 132(3) of auxiliary memory 130(4) upon read-in of signals to memory 121(4), as described above. This pulse to read-in coil 132(3) is also impressed on the grid of the nonconducting side of flip-flop circuit 215 via line 216, thereby causing said flip-flop circuit to switch. Switching of this circuit causes tube 217 to be driven beyond cut-off so that it is nonconducting. In its nonconducting condition tube 127 is prevented from emanating any output pulse to line 205 and line 150(2). As a result, since flip-flop circuit 215 is not reset to its normal condition until after read-out of the signals in the first section of card 100, tube 217 permits printing of an R upon read-out by the second pulse on line 180. Under the same conditions, that is, no signal having been read into 121(4), the signal appearing on line 163(3) is also delivered to read-out coil 133(3) of auxiliary memory 130(3). Since a signal was read into read-in coil 132(3) by Or circuit 119, a signal is induced in output coil 134(3) and by line 171(3) renders tube 138(3) conductive. The output of tube 138(3) causes flip-flop circuit 160 to switch thereby rendering tubes 139 receptive to the fourth pulse on line 180. Conduction of tube 138(3) also causes tube 161(4) to revert to its blocking position and also resets flip-flop circuit 140(3). The fourth pulse on line 180 will, therefore, be delivered to line 163(5) via tubes 139, the flip-flop circuit 140(5) also being switched thereby and the tube 161(6) being rendered receptive to the fifth pulse. With the printing of MRS the two spaces between the S and first letter of the first name will be contracted to a single space.

If the title on a card is MISS, a signal is imposed on read-in coils 123(4) corresponding to the letter S by distribution means 117 and no signal is imposed by Or circuit 119 on auxiliary memory 130(3). As a result, flip-flop circuit 215 is not switched and tube 217 is maintained in a conducting condition. With read-out by the pulse on line 163(2), which is connected to the cathode of tube 217, an electrical signal will emanate from tube 217 to line 205 and line 150(2), 150(4) and 150(6) which correspond to the letter I rather than R so that an I will be printed. In this instance, the first pulse on line 180 causes the M to be printed, the second pulse the I and the third pulse the S. Since a signal corresponding to the second S has been stored in memory 121(4), the fourth pulse will cause read-out of this S in the normal manner and no contraction of the space between the last S and the first letter of the first name will take place.

From the foregoing description it is evident that the diode group 220 together with the flip-flop circuit 215 and tube 217 provides a means for readily providing a predetermined group of signals for each of two predetermined group of characters as well as a control means for determining the group of characters to be printed. While the embodiment disclosed herein is merely illustrative of the invention and modifications thereof will be readily apparent to those skilled in the art, the invention is not to be limited to the disclosure but is defined by the appended claims.

Having now particularly described my invention, what I desire to secure by Letters Patent of the United States and what I claim is:

1. A device for repetitiously printing a visual representation of a number of predetermined characters in place of a number of different characters represented by code arranged in successive columns and in a predetermined area of a medium, comprising means for scanning said medium and delivering output pulses in accordance with the code in each column and individual to the character represented thereby, distribution means for receiving said output pulses and delivering electrical signals representative of the coded character in each of said columns, memory means associated with only the code columns in said area other than those corresponding to said different characters and connected to said distribution means for read-in of said electrical signals for storage therein, an auxiliary memory means associated with each of said memory means, each of said auxiliary memory means being interconnected to the distribution means associated with the next code column and receiving an electrical signal from said distribution means only when no electrical signal is delivered to its associated memory means, means associated with each of said memory means and said auxiliary memory means for initiating the read-out of said electrical signals received from said distribution means and the read-out of any electrical signal in said auxiliary memory means, a diode matrix responsive to said initiating means for providing electrical signals representative of said predetermined characters in timed relation corresponding to read-out of the electrical signals corresponding to said different characters, and means responsive to the electrical signals read-out of said memory means and provided by said diode matrix for printing characters in accordance with the code in each column and for printing the same predetermined characters in place of said different characters and in accordance with the location of said different characters in said area.

2. A device for repetitiously printing a visual representation of a number of predetermined characters in place of a number of different characters represented by code arranged in successive columns and in a predetermined area of a medium, comprising means for scanning said medium and delivering output pulses in accordance with the code in each column and individual to the character represented thereby, distribution means for receiving said output pulses and delivering electrical signals representative of the coded character in each of said columns, memory means associated with only the code columns in said area other than those corresponding to said different characters and connected to said distribution means for read-in of said electrical signals for storage therein, an auxiliary memory means associated with each of said memory means, each of said auxiliary memory means being interconnected to the distribution means associated with the next code column and receiving an electrical signal from said distribution means only when no electrical signal is delivered to its associated memory means, a ring chain having a unit thereof associated with each of said memory means and successively responsive to periodic pulses for read-out of the electrical signals stored in said memory means, a control tube associated with each of said units for normally blocking its respective unit to said periodic pulses, means for providing periodic pulses to said ring chain and to said memory means for initiating read-out of said electrical signals successively from said memory means in a predetermined relation to said electrical signals received from said distribution means and the read-out of any electrical signal in said auxiliary memory means, means for providing a start signal in timed relation to said periodic pulses to initiate the first unit in said ring chain, said units thereafter being initiated successively by said periodic pulses and each unit, upon being initiated, rendering the control tube associated with the following unit receptive to the succeeding pulse and resetting the preceding unit, a diode matrix connected to only those units of said ring chain corresponding to said different characters and responsive to said periodic pulses for providing electrical signals representative of the same predetermined characters for each medium, and means responsive to the electrical signals read-out of said memory means and provided by said diode matrix for printing characters in accordance with the code in each column and for printing the same predetermined characters in place of said different characters and in accordance with the location of said different characters in said area.

3. A device for repetitiously printing a visual representation of one of two groups of characters in place of a number of different characters represented by code arranged in successive columns and in a predetermined area of a medium, one of said groups being a representation of predetermined characters for each medium and other of said groups being a representation of only certain ones of said different characters on the medium, comprising means for scanning said medium and delivering output pulses in accordance with the code in each column and individual to the character represented thereby, distribution means for receiving said output pulses and delivering electrical signals representative of the coded character in each of said columns, memory means associated with only the code columns in said area other than those corresponding to said different characters and connected to said distribution means for read-in of said electrical signals for storage therein, an auxiliary memory means associated with each of said memory means, each of said auxiliary memory means being interconnected to the distribution means associated with the next code column and receiving an electrical signal from said distribution means only when no signal is delivered to its associated memory means, means associated with each of said memory means and said auxiliary memory means for initiating the read-out of said electrical signals received from said distribution means and the read-out of any electrical signal in said auxiliary memory means, a diode matrix responsive to said initiating means for providing one group of successive electrical signals representative of said predetermined characters and for providing a second group of successive electrical signals representative of said different characters, said groups of signals being in timed relation to read-out of the electrical signals corresponding to said different characters, means associated with said diode matrix, said memory means and said auxiliary memory means corresponding to the first code column beyond said different characters for releasing said first group of electrical signals in response to a signal in said auxiliary memory means and said second group of electrical signals in response to a signal stored in said memory means, and means responsive to the signals read-out of said memory means and provided by said diode matrix for printing characters representative of and corresponding to said electrical signals.

4. A device for repetitiously printing a visual representation of one of two groups of characters in place of a number of different characters represented by code arranged in successive columns and in a predetermined area of a medium, one of said groups being a representation of predetermined characters for each medium and other of said groups being a representation of only certain ones of said different characters on the medium, comprising means for scanning said medium and delivering output pulses in accordance with the code in each column and individual to the character represented thereby, distribution means for receiving said output pulses and delivering electrical signals representative of the coded character in each of said columns, memory means associated with only the code columns in said area other than those corresponding to said different characters and connected to said distribution means for read-in of said electrical signals for storage therein, an auxiliary memory means associated with each of said memory means, each of said auxiliary memory means being interconnected to the distribution means associated with the next code column and receiving an electrical signal from said distribution means only when no signal is delivered to its associated memory means, means associated with each of said memory means and said auxiliary memory means for initiating the read-out of said electrical signals received from said distribution means and the read-out of any electrical signal in said auxiliary memory means, a diode matrix responsive to said initiating means for providing one group of successive electrical signals representative of said predetermined characters and for providing a second group of successive electrical signals representative of the certain ones of said different characters, said groups of signals being in timed relation to read-out of the electrical signals corresponding to said different characters, means associated with said diode matrix, said memory means and said auxiliary memory means corresponding to the first code column beyond said different characters for releasing said first group of electrical signals in response to a signal in said auxiliary memory means, and means responsive to the signals provided by said diode matrix for printing the characters corresponding thereto.

5. A device for repetitiously printing a visual representation of one of two groups of characters in place of a number of different characters represented by code arranged in successive columns and in a predetermined area of a medium, one of said groups being a representation of predetermined characters for each medium and other of said groups being a representation of only certain ones of said different characters on the medium, comprising means for scanning said medium and delivering output pulses in accordance with the code in each column and individual to the character represented thereby, distribution means for receiving said output pulses and delivering electrical signals representative of the coded character in each of said columns, memory means associated with only the code columns in said area other than those corresponding to said different characters and connected to said distribution means for read-in of said electrical signals for storage therein, an auxiliary memory means associated with each of said memory means, each of said auxiliary memory means being interconnected to the distribution means associated with the next code column and receiving an electrical signal from said distribution means only when no signal is delivered to its associated memory means, means associated with each of said memory means and said auxiliary memory means for initiating the read-out of said electrical signals received from said distribution means and the read-out of any electrical signal in said auxiliary memory means, a diode matrix responsive to said initiating means for providing one group of successive electrical signals representative of said predetermined characters and for providing a second group of successive electrical signals representative of the certain ones of said different characters, said groups of signals being in timed relation to read-out of the electrical signals corresponding to said different characters, means associated with said diode matrix, said memory means and said auxiliary memory means corresponding to the first code column beyond said different characters for releasing said second group of electrical signals in response to a signal released by said memory means, and means responsive to the signals provided by said diode matrix for printing the certain ones of said different characters corresponding thereto.

6. A device for repetitiously printing a visual representation of one of two groups of characters in place of a number of different characters represented by code arranged in successive columns and in a predetermined area of a medium, one of said groups being a representation of predetermined characters for each medium and other of said groups being a representation of only certain ones of said different characters on the medium, comprising means for scanning said medium and delivering output pulses in accordance with the code in each column and individual to the character represented thereby, distribution means for receiving said output pulses and delivering electrical signals representative of the coded character in each of said columns, memory means associated with only the code columns in said area other than those corresponding to said different characters and connected to said distribution means for read-in of said electrical signals for storage therein, an auxiliary memory means associated with each of said memory means, each of said auxiliary memory means being interconnected to the distribution means associated with the next code column and receiving an electrical signal from said distribution means only when no signal is delivered to its associated memory means, a ring chain having a unit thereof associated with each of said memory means and successively responsive to periodic pulses for read-out of the electrical signals stored in said memory means, a control tube associated with each of said units for normally blocking its respective unit to said periodic pulses, means for providing periodic pulses to said ring chain and to said memory means for initiating read-out of said electrical signals successively from said memory means in a predetermined relation to said electrical signals received from said distribution means and the read-out of any electrical signal in said auxiliary memory means, means for providing a start signal in timed relation to said periodic pulses to initiate the first unit in said ring chain, said units thereafter being initiated successively by said periodic pulses and each unit, upon being initiated, rendering the control tube associated with the following unit receptive to the succeeding pulse and resetting the preceding unit, a diode matrix connected to only those units of said ring chain corresponding to said different characters and responsive to a like number of said periodic pulses for providing one group of successive electrical signals representative of said predetermined characters and for providing a second group of successive electrical signals representative of the certain ones of said different characters on said medium, said groups of signals being in timed relation to read-out of the electrical signals corresponding to said different characters, a control tube associated with said diode matrix, said control tube in a nonconducting state permitting said first group of signals to be released by said periodic pulses and in a conducting state permitting said second group of signals to be released by said periodic pulses, a trigger circuit responsive to a signal stored in said auxiliary memory means associated with the first code column beyond said columns of different characters for maintaining said control tube nonconducting and responsive to a signal stored in said memory means associated with the same code column for rendering said control tube conducting, and means responsive to the signals read-out of said memory means and released by said diode matrix for printing characters representative of and corresponding to said electrical signals.

7. A device for repetitiously printing a visual representation of one of two groups of characters in place of a number of different characters represented by code arranged in successive columns and in a predetermined area of a medium, one of said groups being a representation of predetermined characters for each medium and other of said groups being a representation of only certain ones of said different characters on the medium, comprising means for scanning said medium and delivering output pulses in accordance with the code in each column and individual to the character represented thereby, distribution means for receiving said output pulses and delivering electrical signals representative of the coded character in each of said columns, memory means associated with only the code columns in said area other than those corresponding to said different characters and connected to said distribution means for read-in of said electrical signals for storage therein, an auxiliary memory means associated with each of said memory means, each of said auxiliary memory means being interconnected to the distribution means associated with the next code column and receiving an electrical signal from said distribution means only when no signal is delivered to its associated memory means, a ring chain having a unit thereof associated with each of said memory means and successively responsive to periodic pulses for read-out of the electrical signals stored in said memory means, a control tube associated with each of said units for normally blocking its respective unit to said periodic pulses, means for providing periodic pulses to said ring chain and to said memory means for initiating read-out of said electrical signals successively from said memory means in a predetermined relation to said electrical signals received from said distribution means and the read-out of any electrical signal in said auxiliary memory means, means for providing a start signal in timed relation to said periodic pulses to initiate the first unit in said ring chain, said units thereafter being initiated successively by said periodic pulses and each unit, upon being initiated, rendering the control tube associated with the following unit receptive to the succeeding pulse and resetting the preceding unit, a diode matrix connected to only those units of said ring chain corresponding to said different characters and responsive to a like number of said periodic pulses for providing one group of successive electrical signals representative of the predetermined characters and for providing a second group of successive electrical signals representative of only the certain ones of said different characters on said medium, said groups of signals being in timed relation to read-out of the electrical signals corresponding to said different characters, a control tube associated with said diode matrix, said control tube in a nonconducting state permitting said first group of signals to be released by said periodic pulses, a trigger circuit responsive to a signal stored in said auxiliary memory means associated with the first code column beyond said columns of different characters for maintaining said diode control tube nonconducting, and means responsive to the signals released by said diode matrix for printing characters representative of and corresponding to said electrical signals.

8. A device for repetitiously printing a visual representation of one of two groups of characters in place of a number of different characters represented by code arranged in successive columns and in a predetermined area of a medium, one of said groups being a representation of predetermined characters for each medium and other of said groups being a representation of only certain ones of said different characters on the medium, comprising means for scanning said medium and delivering output pulses in accordance with the code in each column and individual to the character represented thereby, distribution means for receiving said output pulses and delivering electrical signals representative of the coded character in each of said columns, memory means associated with only the code columns in said area other than those corresponding to said different characters and connected to said distribution means for read-in of said electrical signals for storage therein, an auxiliary memory means associated with each of said memory means, each of said auxiliary memory means being interconnected to the distribution means associated with the next code column and receiving an electrical signal from said distribution means only when no signal is delivered to its associated memory means, a ring chain having a unit thereof associated with each of said memory means and successively responsive to periodic pulses for read-out of the electrical signals stored in said memory means, a control tube associated with each of said units for normally blocking its respective unit to said periodic pulses, means for providing periodic pulses to said ring chain and to said memory means for initiating read-out of said electrical signals successively from said memory means in a predetermined relation to said electrical signals received from said distribution means and the read-out of any electrical signal in the next auxiliary memory means, means for providing a start signal in timed relation to said periodic pulses to initiate the first unit in said ring chain, said units being initiated successively by said periodic pulses and each unit, upon being initiated, rendering the control tube associated with the following unit receptive to the succeeding pulse and resetting the preceding unit, a diode matrix connected to only those units of said ring chain corresponding to said different characters and responsive to a like number of said periodic pulses for providing one group of successive electrical signals representative of the predetermined characters and for providing a second group of successive electrical signals representative of only the certain ones of said different characters on said medium, said groups of signals being in timed relation to read-out of the electrical signals corresponding to said different characters, a control tube associated with said diode matrix, said control tube in a conducting state permitting said second group of signals to be released by said periodic pulses, a trigger circuit responsive to a signal stored in said memory means associated with the first code column beyond said columns of different characters for maintaining said diode control tube conducting, and means responsive to the signals released by said diode matrix for printing characters representative of and corresponding to said electrical signals.

References Cited in the file of this patent

UNITED STATES PATENTS

| | | |
|---|---|---|
| Re. 23,713 | Hunt | Sept. 23, 1953 |
| 2,575,017 | Hunt | Nov. 13, 1951 |